US012623453B2

(12) United States Patent
Yoshino et al.

(10) Patent No.: US 12,623,453 B2
(45) Date of Patent: May 12, 2026

(54) LIQUID DROPLET DISCHARGING APPARATUS

(71) Applicant: BROTHER KOGYO KABUSHIKI KAISHA, Nagoya (JP)

(72) Inventors: Takaaki Yoshino, Nagoya (JP); Toru Kakiuchi, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 176 days.

(21) Appl. No.: 18/524,952

(22) Filed: Nov. 30, 2023

(65) Prior Publication Data

US 2024/0278557 A1 Aug. 22, 2024

(30) Foreign Application Priority Data

Feb. 22, 2023 (JP) ................................ 2023-026399

(51) Int. Cl.
*B41J 2/045* (2006.01)

(52) U.S. Cl.
CPC ....... *B41J 2/04573* (2013.01); *B41J 2/04541* (2013.01); *B41J 2/04581* (2013.01)

(58) Field of Classification Search
CPC .............. B41J 2002/14354; B41J 2/125; B41J 2/14233; B41J 2/04581
See application file for complete search history.

(56) References Cited

U.S. PATENT DOCUMENTS 5,757,392 A * 5/1998 Zhang .................. B41J 2/04581 347/14
7,357,474 B2 * 4/2008 Groninger ............ B41J 2/04588 347/19
7,387,356 B2 * 6/2008 Shinkawa ............ B41J 2/16579 347/19
7,410,232 B2 * 8/2008 Takahashi ............ B41J 2/04593 347/11
2005/0219286 A1 * 10/2005 Nagashima .......... B41J 2/14233 347/9
2006/0244772 A1 * 11/2006 Sekiguchi ............ B41J 2/04581 347/10
2016/0082720 A1 * 3/2016 Ready .................... B41J 2/0451 347/14
2017/0246893 A1 * 8/2017 Muto .................. B41J 2/04588
(Continued)

FOREIGN PATENT DOCUMENTS

JP 2000-280463 A 10/2000

*Primary Examiner* — John P Zimmermann
(74) *Attorney, Agent, or Firm* — Merchant & Gould P.C.

(57) ABSTRACT

A liquid droplet discharging apparatus includes: a channel member having a nozzle and a pressure chamber; an actuator which applies pressure to liquid inside the pressure chamber; and a controller which applies a driving signal to the actuator. Within one discharging cycle, the driving signal includes: a main pulse for causing a liquid droplet to be discharged from the nozzle; and a cancel pulse which is applied to the actuator after the main pulse. In a case that a driving frequency of the driving signal is f (unit: kHz), a time from an end point of the main pulse to a start point of the cancel pulse is Tw (unit: μsec) and a width of the cancel pulse is Tc (unit: μsec), the following expressions (1) and (2) hold: $50 \le f \le -11.3 \times (Tw+Tc)+120$ . . . (1); and $Tw+Tc \le 5.2$ . . . (2).

10 Claims, 7 Drawing Sheets

(56) References Cited

U.S. PATENT DOCUMENTS

| | | | | | |
|---|---|---|---|---|---|
| 2023/0158794 | A1 * | 5/2023 | Yoshino | B41J 2/04596 | 347/14 |
| 2023/0202172 | A1 * | 6/2023 | Wong | B41J 2/14209 | 347/68 |

* cited by examiner

LIQUID DROPLET DISCHARGING APPARATUS

REFERENCE TO RELATED APPLICATIONS

This application claims priority from Japanese Patent Application No. 2023-026399 filed on Feb. 22, 2023. The entire content of the priority application is incorporated herein by reference.

BACKGROUND ART

Conventionally, there is a known ink jetting apparatus (liquid droplet discharging apparatus) configured to apply, to an actuator, a driving signal having a total of three pulse signals which are two jetting pulse signals and one non-jetting pulse signal, with respect to a printing command per one dot (within one discharging cycle). With this, a pressure wave is generated in an ink channel and ink droplets are discharged from a nozzle.

SUMMARY

In the recent years, the liquid droplet discharging apparatus is required to drive the actuator at a high frequency, from a viewpoint of realizing a high-speed recording. In a case that the frequency of the driving signal is approximately 20 kHz, it is possible to discharge liquid droplets stably from the nozzle by the driving signal in the above-described conventional ink jetting apparatus. In a case that the frequency of the driving signal is raised higher, however, the discharge becomes unstable with the driving signal in the above-described conventional ink jetting apparatus. Further, depending on the configuration of the driving signal, it is not possible to adjust an amount of the liquid droplet discharged from the nozzle, thereby making it impossible to realize any gradation expression (half-toning).

An object of the present disclosure is to provide a liquid droplet discharging apparatus capable of realizing the stable discharge and the gradation expression by a driving with a high frequency.

According to an aspect of the present disclosure, there is provided a liquid droplet discharging apparatus including: a channel member having a nozzle and a pressure chamber communicating with the nozzle; an actuator configured to apply pressure to liquid inside the pressure chamber; and a controller configured to apply a driving signal to the actuator, wherein within one discharging cycle for forming one dot, the driving signal includes: a main pulse for causing a liquid droplet of the liquid to be discharged from the nozzle; and a cancel pulse which is applied to the actuator after the main pulse, the cancel pulse being a pulse for canceling a pressure wave, inside the pressure chamber, generated by application of the main pulse, the controller is configured to drive the actuator in a pull-strike system of increasing volume of the pressure chamber from a predetermined volume and then decreasing the volume to be not more than the predetermined volume to thereby cause the liquid droplet to be discharged from the nozzle, and in a case that a driving frequency of the driving signal is f (unit: kHz), a time from an end point of the main pulse up to a start point of the cancel pulse is Tw (unit: μsec) and a width of the cancel pulse is Tc (unit: μsec), the following expressions (1) and (2) hold: $50 \le f \le -11.3 \times (Tw+Tc)+120$ . . . (1); and $Tw+Tc \le 5.2$ . . . (2).

DESCRIPTION

Figure 1:
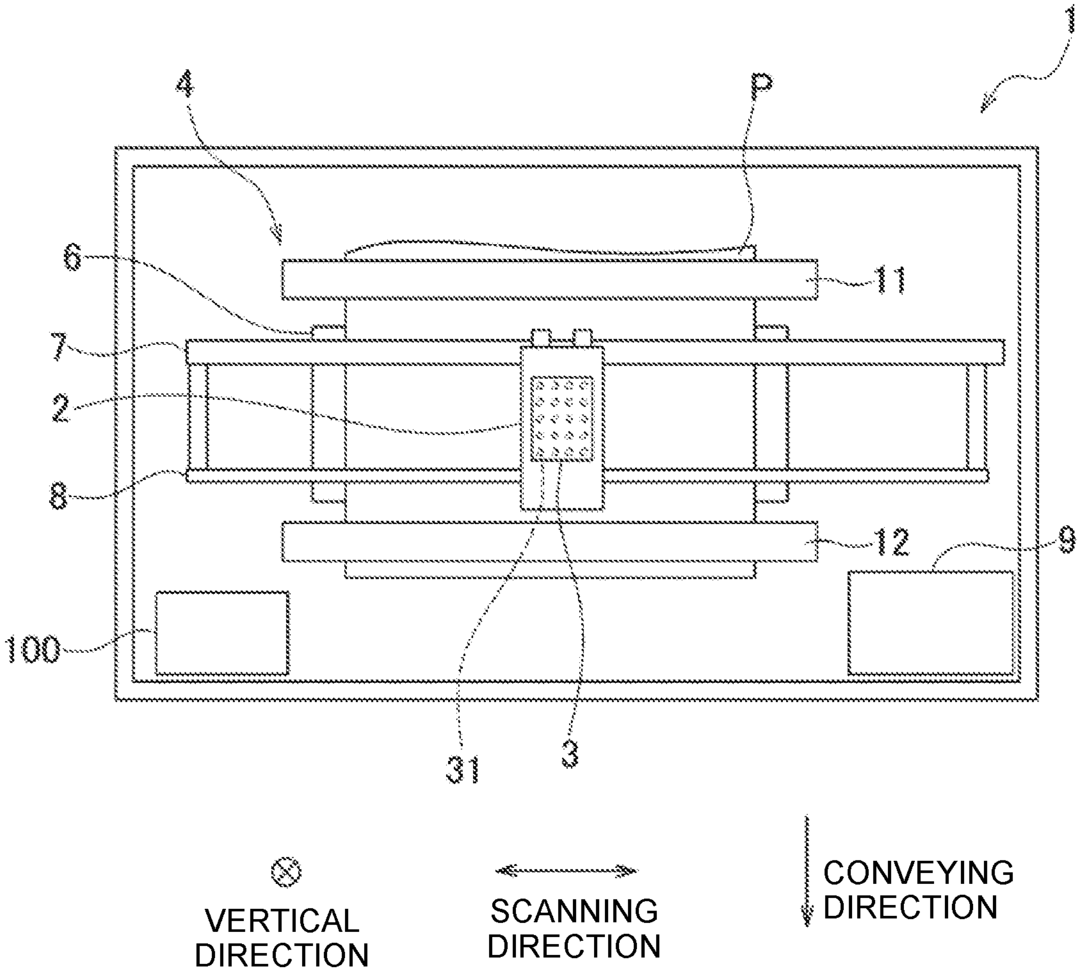
FIG. 1 is a plan view schematically depicting a printer according to an embodiment of the present disclosure.

As depicted in FIG. 1, a printer 1 according to an embodiment of the present disclosure is provided with a head 3, a carriage 2 capable of moving in a scanning direction (a direction orthogonal to the vertical direction) while holding the head 3, a platen 6 configured to support a paper sheet P below the head 3 and the carriage 2, a conveying mechanism 4 configured to convey the paper sheet P in a conveying direction (a direction orthogonal to the scanning direction and the vertical direction), and a controller 100. A plurality of nozzles 31 is formed in a lower surface of the head 3.

The carriage 2 is supported by a pair of guide rails 7 and 8 extending in the scanning direction. In a case that a carriage motor 2M (see FIG. 4) is driven by a control of the controller 100, the carriage 2 is thereby moved in the scanning direction along the pair of guide rails 7 and 8.

The conveying mechanism 4 includes two roller pairs 11 and 12 which are arranged, respectively, to sandwich the platen 6 and the carriage 2 in the conveying direction. In a case that a conveying motor 4M (see FIG. 4) is driven by a control of the controller 100, the roller pairs 11 and 12 are thereby caused to rotate in a state that the paper sheet P is held or pinched therebetween, so as to convey the paper sheet P in the conveying direction.

Figure 2:
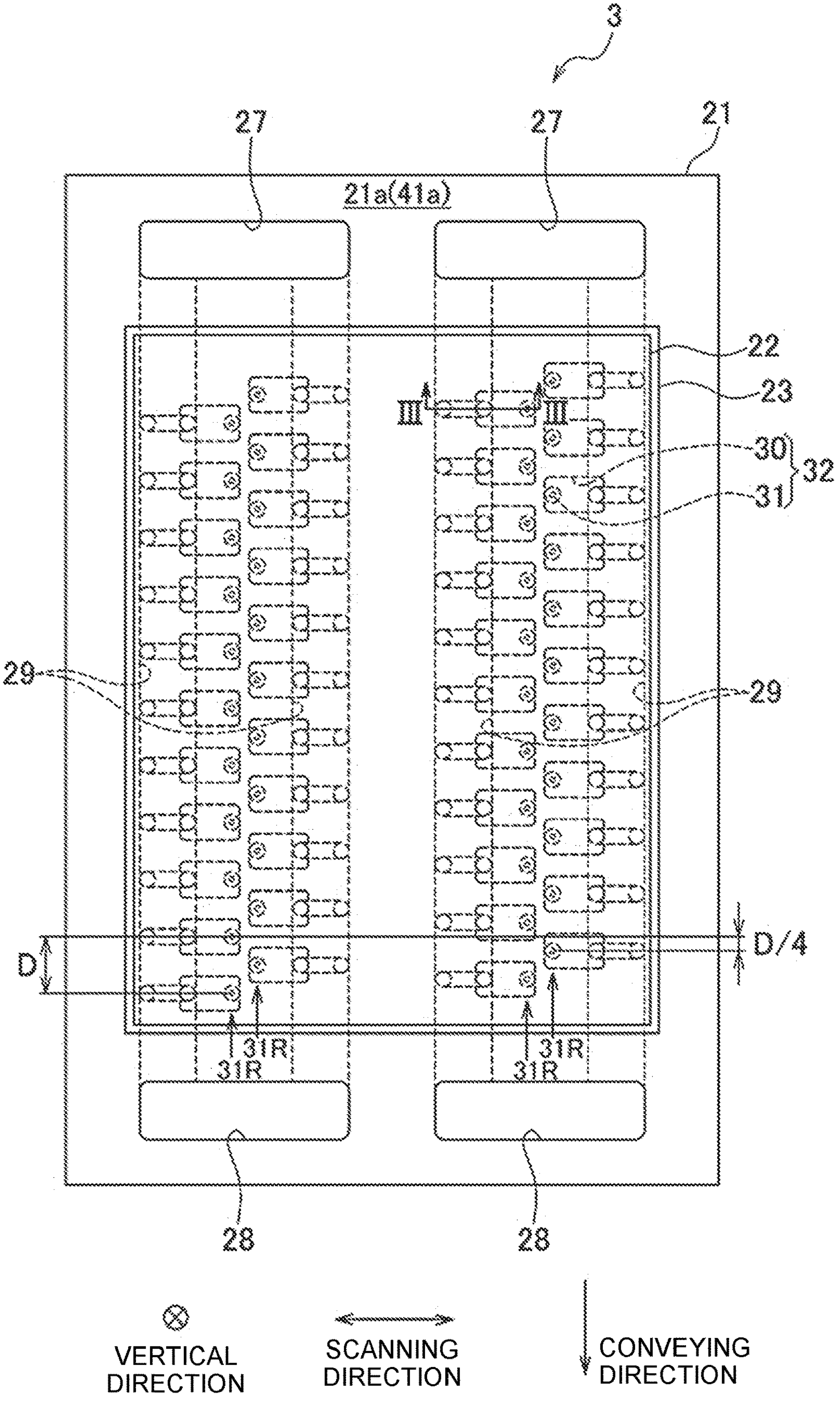
FIG. 2 is a plan view of a head included in the printer.
Figure 3:
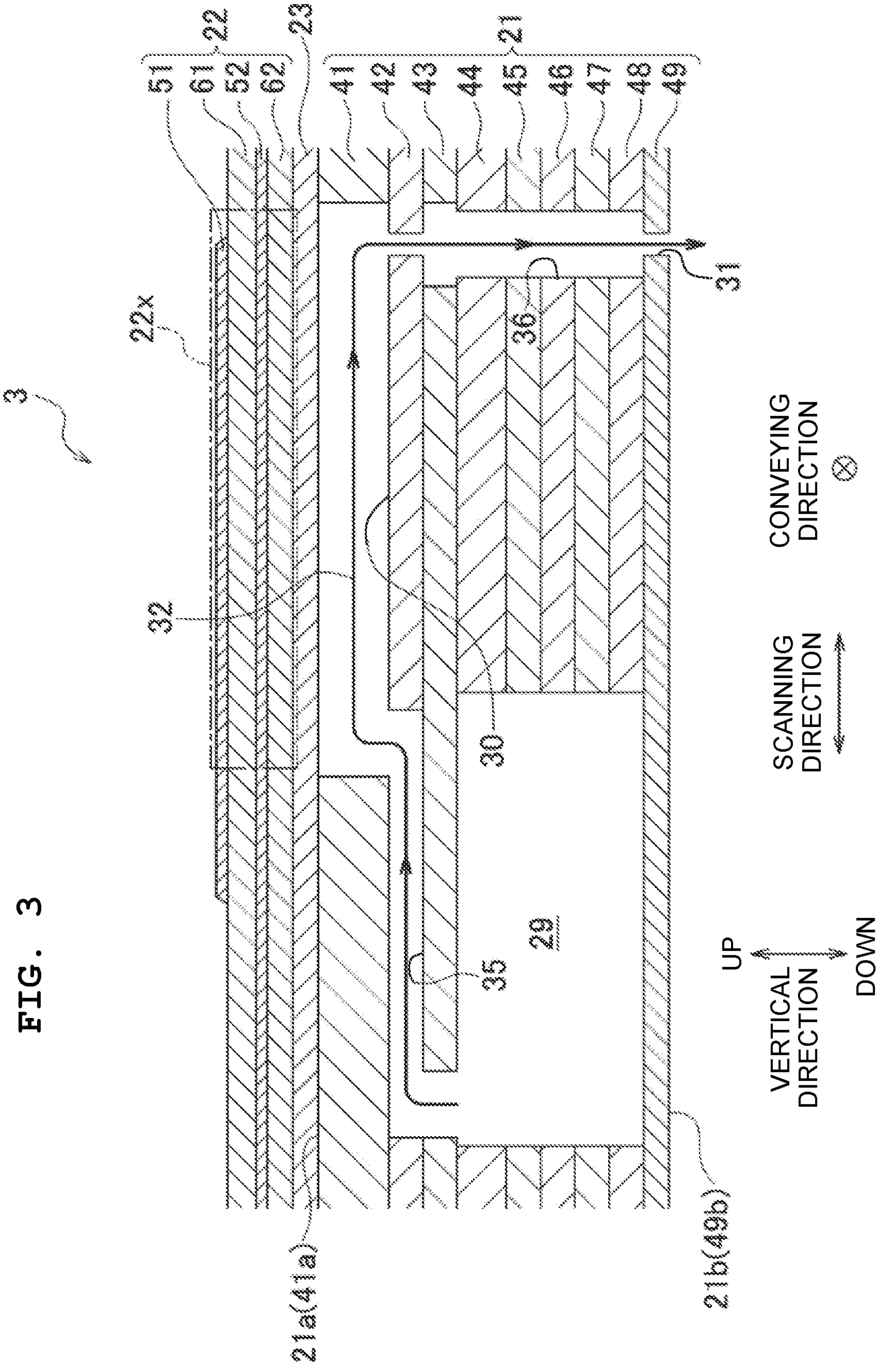
FIG. 3 is a cross-sectional view of the head along a III-III line of FIG. 2.

As depicted in FIGS. 2 and 3, the head 3 includes a channel member 21, an actuator member 22 arranged on a front surface 21*a* of the channel member 21 and a sealing member 23 arranged between the channel member 21 and the actuator member 22.

As depicted in FIG. 3, the channel member 21 is constructed of 9 plates which are plates 41 to 49. The plates 41 to 49 are stacked on one another in the vertical direction (a thickness direction of each of the plates 41 to 49). Each of the plates 41 to 49 is formed of a metallic material (stainless steel, etc.).

A plurality of pressure chambers 30 is formed in the plate 41. The nozzles 31 are formed in the plate 49. A front surface 41*a* of the plate 41 corresponds to the front surface 21*a* of the channel member 21, and a rear surface 49*b* of the plate 49 corresponds to a rear surface 21*b* of the channel member 21. The pressure chambers 30 are opened in the front surface 21*a*, and the nozzles 31 are opened in the rear surface 21*b*.

As depicted in FIG. 2, the nozzles 31 are aligned in the conveying direction so as to constructs four nozzle rows 31R arranged side by side in the scanning direction. In each of the four nozzle rows 31R, the nozzles 31 are aligned at a density which is not less than 50 dpi and at a spacing distance which is pitch D. Among the four nozzle rows 31R, positions in the conveying direction of the nozzles 31 are shifted by D/4. With this, a recording resolution in the conveying direction in the head 3 (a resolution of an image to be formed by ink droplets discharged from each of the nozzles 31) is made to be not less than 1200 dpi.

Four common channels 29 (see FIG. 2) are formed in the plates 44 to 48. With respect to each of the pressure chambers 30, a communicating channel 35 which communicates the pressure chamber 30 to one of the four common channels 29 is formed in the plates 42 and 43. With respect to each of the pressure chambers 30, a connecting 36 which connects the pressure chamber 30 to one of the nozzles 31 is formed in the plates 42 to 48. Each of the pressure chambers 30 communicates with one of the nozzles 31 via the connecting channel 36.

As depicted in FIG. 2, the four common channels 29 extend in the conveying direction respectively and are arranged side by side in the scanning direction. The four common channels 29 are provided, respectively, for the four nozzle rows 31R. The ink is supplied from each of the four common channels 29 to one of the pressure chambers 31 communicating with a nozzle 31 of one of the four nozzle rows 31R, via the communicating channel 35 (see FIG. 3). Further, in a case that each of actuators 22*x* of the actuator member 22 is deformed as will be described later on, pressure is applied to the ink inside the pressure chamber 30, and the ink passes through the connecting channel 36 and is discharged from the nozzle 31.

In such a manner, the four common channels 29 and a plurality of individual channels 32 (each of which is a channel including one of the pressure chambers 30 and one of the nozzles 31, and starting from an outlet of one of the four common channels 29 and reaching the nozzle 31 via the communicating channel 35, the pressure chamber 30 and the connecting channel 36) are formed in the channel member 21.

As depicted in FIG. 2, two supply ports 27 and two return ports 28 are formed in the front surface 21*a* of the channel member 21. The two supply ports 27 are arranged on an upstream side in the conveying direction with respect to the four common channels 29. The two return ports 28 are arranged on a downstream side in the conveying direction with respect to the four common channels 29. Each of the two supply ports 27 and the two return ports 28 is communicated with an ink tank 9 (see FIG. 1) via a tube, etc. Each of the two supply ports 27 is communicated with two common channels 29, of the four common channels 29, which are adjacent to each other in the scanning direction, and supplies the ink from the ink tank 9 to these two common channels 29. Each of the two return ports 28 is communicated with the two common channels 29, of the four common channels 29, which are adjacent to each other in the scanning direction, and causes the ink to be returned to the ink tank from these two common channels 29.

As depicted in FIG. 2, the actuator member 22 is arranged in the center of the front surface 21*a* of the channel member 21, does not cover the two supply ports 27 and the two return ports 28, and covers all the pressure chambers 30 opened in the front surface 21*a*. As depicted in FIG. 3, the actuator member 22 includes two piezoelectric layers 61 and 62, a common electrode 52 and a plurality of individual electrodes 51. The two piezoelectric layers 61 and 62 and the common electrode 52 define an outer shape of the actuator member 22 as depicted in FIG. 2, and have a rectangular shape which is one size smaller than that of the channel member 21 as viewed from the vertical direction. On the other hand, each of the individual electrodes 51 is provided on one of the pressure chambers 30 and overlaps with the one of the pressure chambers 30 in the vertical direction.

As depicted in FIG. 2, the sealing member 23 is arranged in the center of the front surface 21*a* of the channel member 21, does not cover the two supply ports 27 and the two return ports 28, and covers all the pressure chambers 30 opened in the front surface 21*a*, similarly to the actuator member 22. The sealing member 23 has a rectangular shape which is one size smaller than the channel member 21 and one size greater than the actuator member 22, as viewed from the vertical direction. The sealing member 23 is adhered to the front surface 21*a* via an adhesive, and seals the pressure chambers 30. The sealing member 23 is made of a material different from that of the two piezoelectric layers 61 and 62 (the different material being a material with low ink permeability such as stainless steel, etc.).

In the present embodiment, the thickness of each of the two piezoelectric layers 61 and 62 is not less than 10 μm, the thickness of the sealing member 23 is approximately 10 μm, and the thickness of each of the individual electrodes 51 and the common electrode 52 is approximately in a range of 0.5 μm to 1.5 μm.

Figure 4:
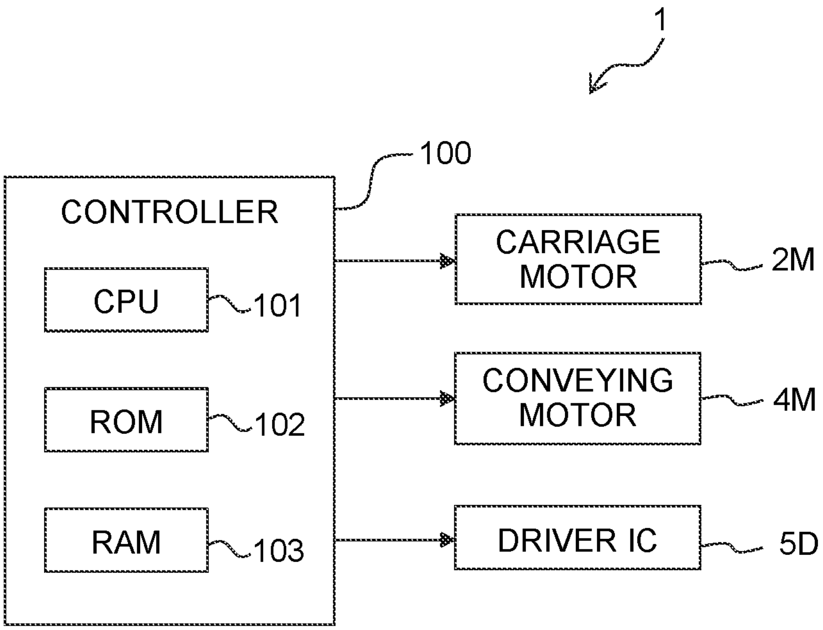
FIG. 4 is a block diagram depicting an electrical configuration of the printer.

The individual electrodes 51 and the common electrode 52 are electrically connected to a driver IC 5D (see FIG. 4). The driver IC 5D maintains potential of the common electrode 52 at ground potential, whereas the driver IC 5D changes potential of each of the individual electrodes 51 between a predetermined driving potential and the ground potential. Specifically, the driver IC 5D generates a driving signal based on a control signal from the controller 100 and supplies the driving signal to the individual electrode 51. With this, the potential of the individual electrode 51 is changed between the predetermined driving potential and the ground potential. In this situation, a part, in the piezoelectric layer 61, which is sandwiched between the individual electrode 51 and the common electrode 52 contracts in a plane direction by a piezoelectric transverse effect. Accompanying with this, a part (an actuator 22*x*), in the actuator member 22, which overlaps with the pressure chamber 30 is deformed to project toward the pressure chamber 30 together with the sealing member 23, thereby reducing volume of the pressure chamber 30 and applying pressure to the ink inside the pressure chamber 30. The ink passes through the connecting channel 36 and is discharged from a nozzle 31 corresponding to the pressure chamber 30. Concurrently with this, the ink inside the common channel 29 passes the communicating channel 35 and is supplied to the pressure chamber 30, and the ink is supplied to the common channel 29 from the ink tank 9.

The actuators 22*x* included in the actuator member 22 are piezoelectric elements of a unimorph type, and are independently deformable in accordance with the application of voltage, by the driver IC 5D, to each of the individual electrodes 51.

As depicted in FIG. 4, the controller 100 includes a CPU 101, a ROM 102 and a RAM 103. Programs, data, etc., by which the CPU 101 performs a variety of kinds of control are stored in the ROM 102. The RAM 103 temporarily stores data used by the CPU 101 in a case that the CPU 101 executes the program. The CPU 101 executes a variety of kinds of control based on data inputted from an external apparatus (such as a personal computer, etc.) and/or an input part (a switch and/or a button provided on an outer surface of a casing of the printer 1), and in accordance with the programs, data, etc., stored in the ROM 102 and/or the RAM 103.

Figure 5:
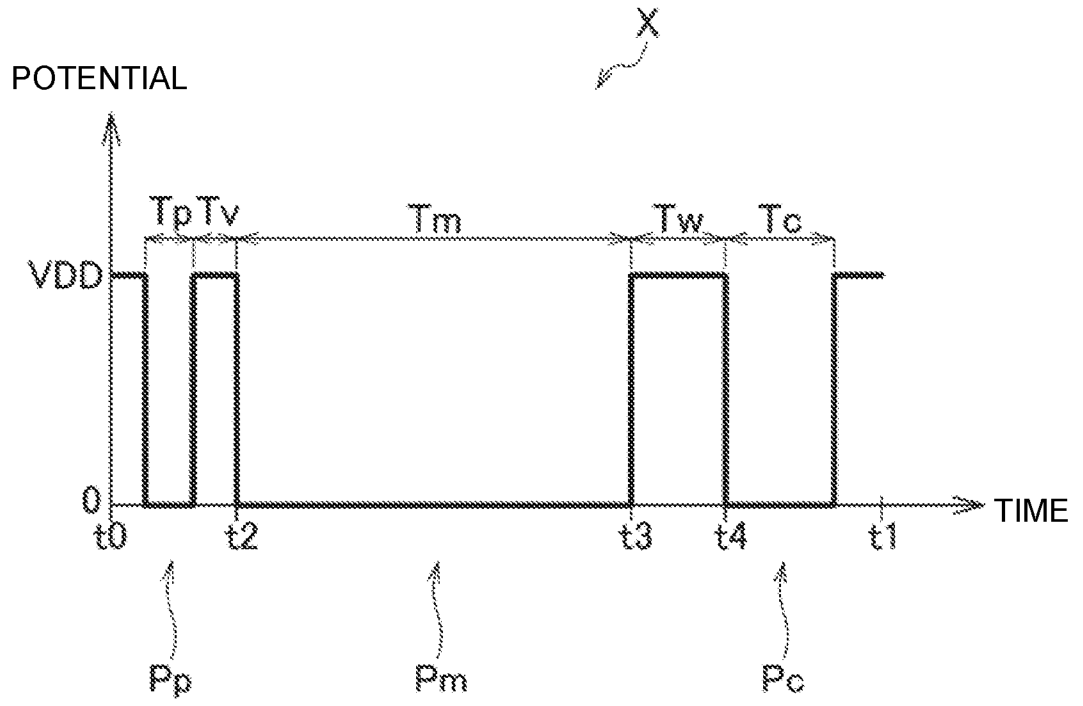
FIG. 5 is a graph indicating a driving signal to be supplied by a driver IC of the head to an actuator.

An example of the driving signal to be supplied by the driver IC 5D to each of the individual electrodes 51 by the control of the controller 100 is depicted in FIG. 5.

A driving signal X depicted in FIG. 5 includes, within one discharging cycle for forming one dot (a period of time from time to t0 time t1), three pulses each of which is rectangular. These three pulses are constructed of a main pulse Pm, a pre-pulse Pp which is applied before the main pulse Pm and a cancel pulse Pc which is applied after the main pulse Pm.

The main pulse Pm is a pulse for causing an ink droplet of a predetermined size to be discharged from the nozzle 31.

The pre-pulse Pp and the cancel pulse Pc are for suppressing a satellite droplet and a mist, and have a width Tp and a width Tc, respectively, which are smaller than a width Tm of the main pulse Tm. Each of the satellite droplet and the mist is an ink droplet which is separated from an ink droplet (main droplet) generated by the application of the main pulse Pm, and of which size is smaller than that of the main droplet. The mist is an ink droplet of which size is smaller than that of the satellite droplet. The pre-pulse Pp cancels pressure wave, in the pressure chamber 30, which is generated by a previous discharging cycle prior to a current discharging cycle. The cancel pulse Pc cancels pressure wave, in the pressure chamber 30, which is generated by the current discharging cycle by the application of the main pulse Pm.

In the present embodiment, in an initial state (time t0), predetermined driving potential (VDD) is applied to an individual electrode 51, and a part, in the piezoelectric layer 61, which is sandwiched between the individual electrode 51 and the common electrode 52 contracts in the plane direction, and a part (actuator 22*x*), in the actuator member 22, which overlaps with a pressure chamber 30 corresponding to the individual electrode 51 is deformed so as to project toward the pressure chamber 30, together with the sealing member 23. Further, in a case that the potential of the individual electrode 51 becomes the ground potential (0V) at a starting point t2 of the main pulse Pm, the contraction in the plane direction of the part in the piezoelectric layer 61 which is sandwiched between the individual electrode 51 and the common electrode 52 is released, thereby making the actuator 22*x* to be flat together with the sealing member 23. With this, volume of the pressure chamber 30 is increased than that in the initial state, and the ink is pulled or sucked from the common channel 29 into the individual channel 32 including the pressure chamber 30. Further afterwards, in a case that the driving potential (VDD) is applied to the individual electrode 51 at an end point t3 of the main pulse Pm, the part, in the piezoelectric layer 61, sandwiched between the individual electrode 51 and the common electrode 52 contracts again in the plane direction, and the actuator 22*x* projects toward the pressure chamber 30 together with the sealing member 23. In this situation, due to the decrease in the volume of the pressure chamber 30, pressure of the ink is increased, thereby causing the ink droplet to be discharged from a nozzle 31 communicating with the pressure chamber 30.

Namely, the driving signal X is of a "pull-strike system" of increasing the volume of the pressure chamber 30 from the predetermined volume and then decreasing the volume of the pressure chamber 30 to be not more than the predetermined volume to thereby cause the ink to be discharged from the nozzle 31. In the "pull-strike system", a negative pressure wave is generated in the pressure chamber 30 in the case that the volume of the pressure chamber 30 is increased, and then the volume of the pressure chamber 30 is decreased to thereby generate the positive pressure wave in the pressure chamber 30, at a timing at which the negative pressure wave is inversed and returns to the pressure chamber 30 as a positive pressure wave, and the positive pressure wave generated in the pressure chamber 30 and the inverted and returned positive pressure wave are overlapped or superimposed. With such an overlap of the pressure waves, large pressure is applied to the ink inside the pressure chamber 30, thereby making it possible to increase discharging pressure.

Further, in the recent years, it is required to drive the actuator 22*x* at a high frequency in view of realizing a high-speed recording. However, with the driving signal X including the main pulse Pm and the cancel pulse Pc in one discharging cycle, as depicted in FIG. 5, the discharge might be unstable in a case that the frequency becomes not less than 50 kHz.

The inventors of the present disclosure found out, as a result of a diligent study and research, that a sum of Tw (time from the end point t3 of the main pulse Pm up to a start point t4 of the cancel pulse Pc) and Tc (width of the cancel pulse Pc) is correlated with a threshold frequency FI (threshold frequency at which ink droplets discharged continuously are not joined together and a dot is independently formed per each of the ink droplets).

Note that the term "start point" of the pulse is a timing at which the potential of the pulse is changed from the potential in the initial state to the predetermined potential of the pulse. Also note that the term "end point" of the pulse is a timing at which the potential of the pulse is changed from the predetermined potential of the pulse to the potential in the initial state. In the present embodiment, the potential is lowered at the start point of the pulse and the potential is raised at the end point of the pulse, as depicted in FIG. 5.

Figure 6:
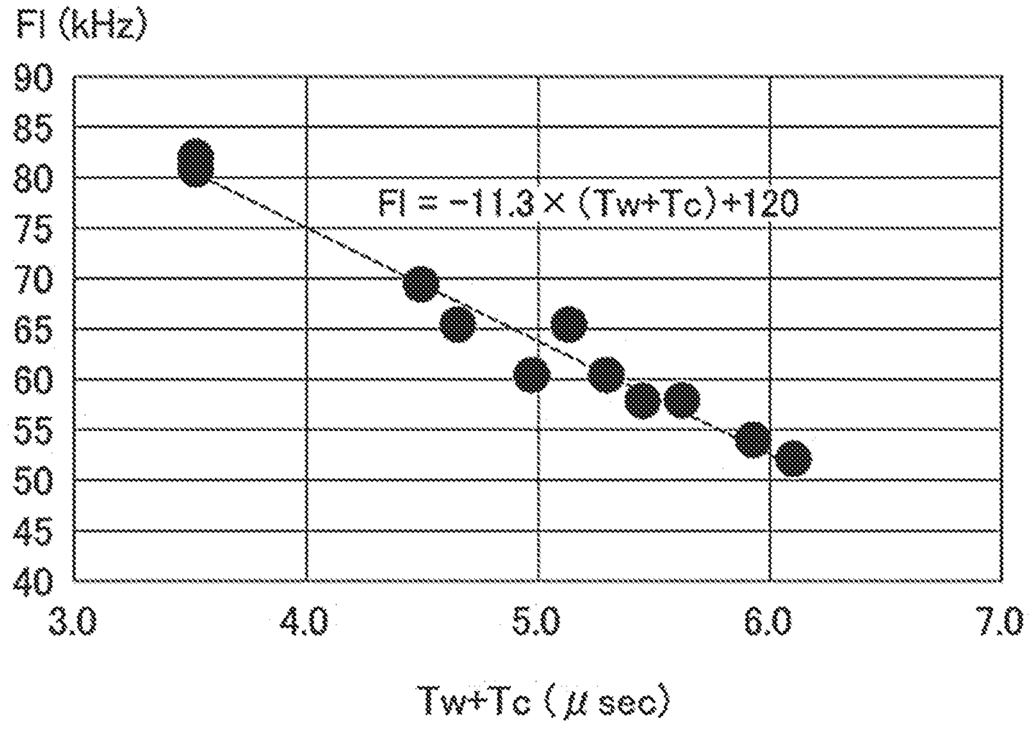
FIG. 6 is a graph indicating a relationship between Tw+Tc indicated in FIG. 5 and a threshold frequency FI.

FIG. 6 indicates the relationship between the Tw+Tc and the threshold frequency FI. In FIG. 6, values of the threshold frequency FI in cases of driving the actuator 22*x* by using a plurality of driving signals X are plotted. The signals X are mutually different at least in one of: Tp (width of the pre-pulse Pp), Tv (time from an end point of the pre-pulse Pp up to the start point t2 of the main pulse Pm), Tm (width of the main pulse Pm), Tw (time from the end point t3 of the main pulse Pm up to the start point t4 of the cancel pulse Pc) and Tc (width of the cancel pulse Pc). Further, in FIG. 6, an expression "−11.3×(Tw+Tc)+120" which is obtained by subjecting the threshold frequency FI to a regression analysis is indicated by a broken line.

Accordingly, in the present embodiment, in a case that the driving frequency of the driving signal X is f (unit: kHz), the time from the end point of the main pulse Pm up to the start point of the cancel pulse Pc is Tw (unit: μsec) and the width of the cancel pulse Pc is Tc (unit: μsec), the following expression (1) is held (in other words, Tw+Tc is set so that the following expression (1) holds in a case that the actuator 22*x* is driven at an arbitrary frequency f which is not less than 50 kHz). By making the expression (1) to be held, a stable discharge can be realized with a driving at a high frequency.

$$50 \leq f \leq -11.3 \times (Tw + Tc) + 120. \quad (1)$$

Further, the inventors of the present disclosure found out that although the amount of the ink droplet to be discharged from the nozzle 31 can be adjusted by changing the ratio of Tw and Tc, a range by which the amount of the liquid droplet is adjustable is limited depending on the value of Tw+Tc.

Figure 7:
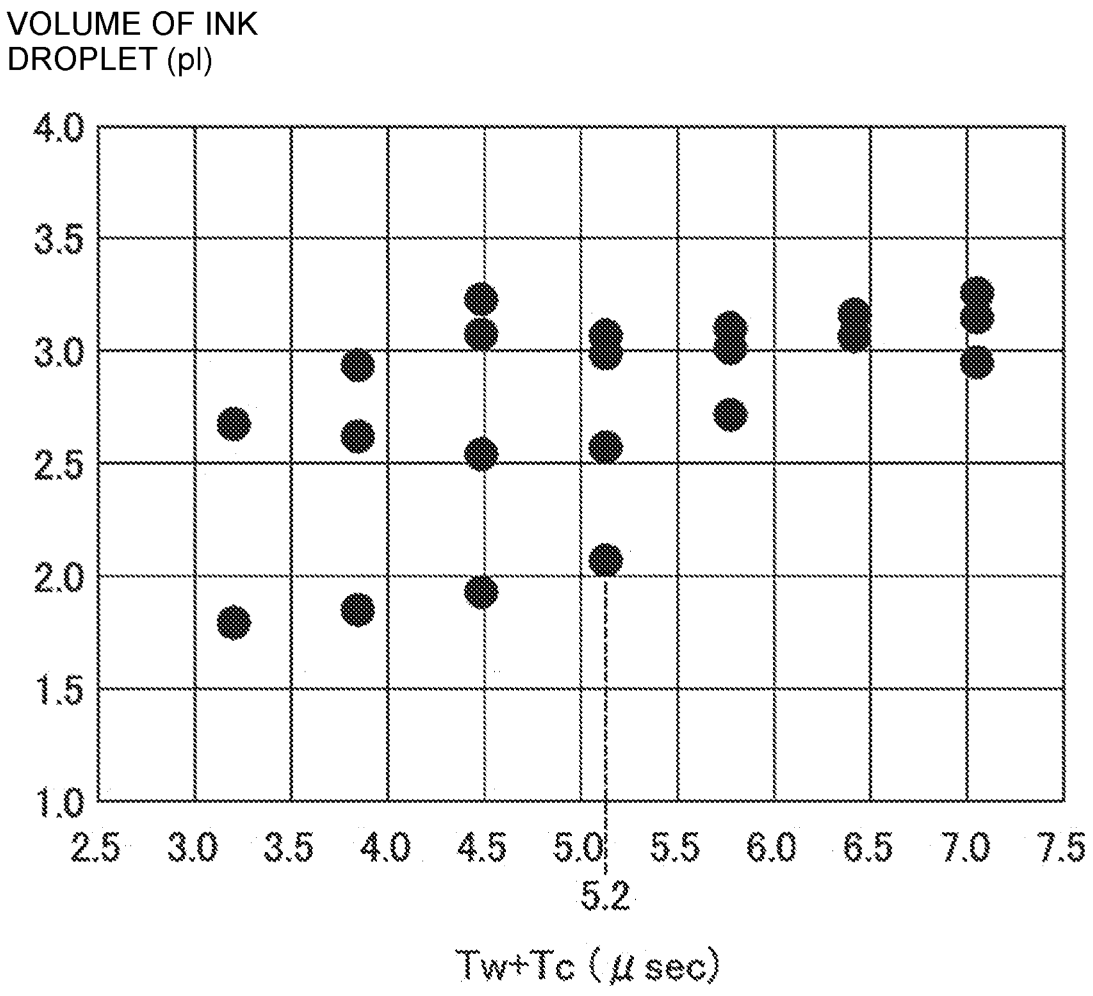
FIG. 7 is a graph indicating a relationship between Tw+Tc indicated in FIG. 5 and volume of an ink droplet.

FIG. 7 indicates the relationship between Tw+Tc and the volume of the ink droplet. From FIG. 7, it is appreciated that in a case that Tw+Tc exceeds 5.2, the minimum volume of the ink droplet exceeds 2.5 pl, and that an ink droplet of a small size cannot be discharged.

Accordingly, in the present embodiment, the following expression (2) is held, in addition to the foregoing expression (1). By making the expression (2) to be held, it is possible to adjust the amount of the ink droplet to be discharged from the nozzle 31 and to realize a gradation expression.

$$Tw + Tc \leq 5.2. \quad (2)$$

Furthermore, the inventors of the present disclosure found out that in a case that the width Tc of the cancel pulse Pc is too great, the cancel pulse Pc functions as the main pulse Pm and that an unintended ink droplet might be discharged in accordance with the application of the cancel pulse Pc.

Figure 8:
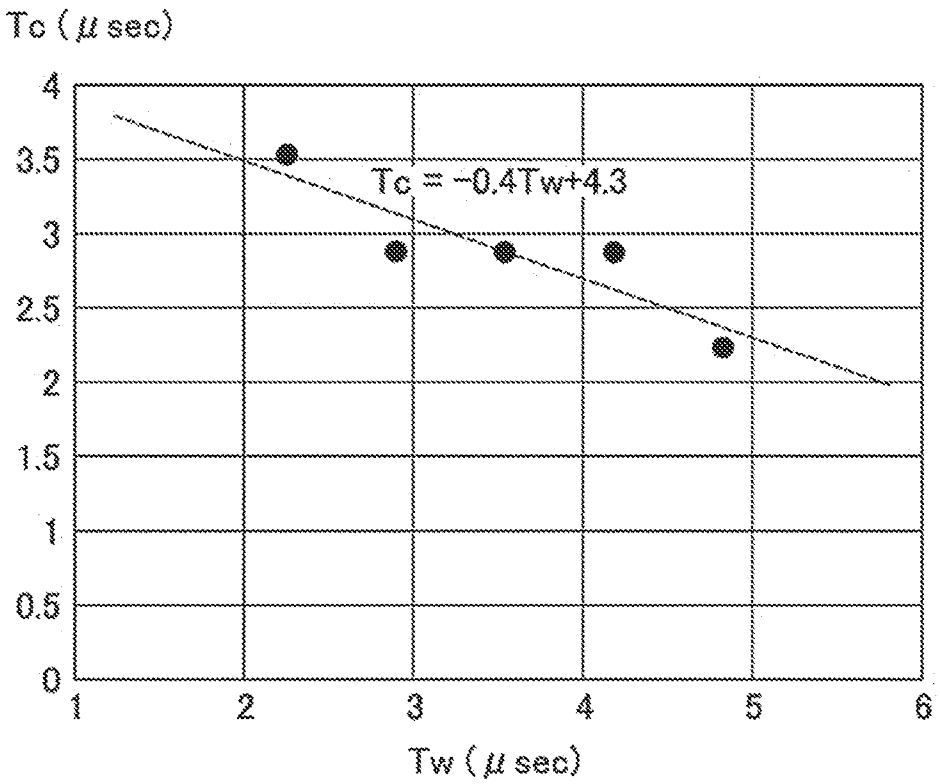
FIG. 8 is a graph indicating a relationship between Tw and Tc, in a case that an unintended ink droplet is discharged in accordance with application of a cancel pulse Pc depicted in FIG. 5.

FIG. 8 indicates a relationship between Tw and Tc in a case that an unintended ink droplet is discharged (the two droplets are discharged) in accordance with the application of the cancel pulse Pc. In FIG. 8, the values of Tw and Tc at the time at which the two droplets have been discharged are plotted. Further, in FIG. 8, an expression "−0.4 Tw+4.3" which is obtained by subjecting Tc at the time of discharging the two droplets to the regression analysis is indicated by a broken line.

Accordingly, in the present embodiment, the following expression (3) is held in addition to the foregoing expressions (1) and (2). By making the expression (3) to be held, the cancel pulse Pc is not allowed to function as the main pulse Pm and thus the ink droplet is not discharged by the application of the cancel pulse Pc. This suppresses occurrence of such a situation that the density of the image becomes to be greater than a desired density.

$$Tc \leq -0.4Tw + 4.3. \quad (3)$$

Each of the main pulse Pm and the cancel pules Pc is rectangular (see FIG. 5). In a case that the main pulse Pm and/or the cancel pulse Pc have a shape different from rectangular (for example, trapezoidal), it is difficult to design the main pulse Pm and the cancel pulse Pc so that the foregoing expressions (1) and (2) hold. In view of this, in the present embodiment, since each of the main pulse Pm and the cancel pulse Pc is rectangular, it is easy to design the main pulse Pm and the cancel pulse Pl so that each of the foregoing expressions (1) and (2) holds.

The recording resolution is not less than 1200 dpi. In order to realize a high resolution of not less than 1200 dpi, the high frequency driving and the gradation expression are effective. In this point, in the present embodiment, the high frequency driving and the gradation expression can be realized by allowing the foregoing expressions (1) and (2) to be held, thereby making it possible to realize the high resolution of not less than 1200 dpi and to obtain an image of a high quality.

The nozzles 31 are aligned in the conveying direction (a first direction) at the density of not less than 50 dpi and construct the four nozzle rows 31R which are arranged side by side in the scanning direction (a second direction). Among the four nozzle rows 31R, the positions in the conveying direction of the nozzles 31 are shifted. With this, it is possible to effectively realize the high resolution of not less than 1200 dpi.

Further, in the present embodiment, the following expression (4) is held in a case that the width of the main pulse is Tm (unit: μsec) and a round trip propagation time of the pressure wave in the individual channel 32 is AL (Acoustic Length; unit: μsec). In other words, the Tm is set so that the expression (4) holds. With this, it is possible to increase the discharging pressure.

$$AL \times 0.7 \leq Tm \leq AL \times 1.3. \quad (4)$$

The AL is not more than 6 μsec. In a case that AL exceeds 6 μsec, the width Tm of the main pulse Pm becomes long (consequently, the length of one discharging cycle becomes long), which in turn makes the realization of the driving at the high frequency to be difficult. In view of this, in the present embodiment, since AL is not more than 6 μsec, the width Tm of the main pulse Pm is short (consequently, the length of one discharging cycle is short), thereby making it possible to easily realize the driving at the high frequency.

The member constructing the nozzles 31 (the plate 49 depicted in FIG. 3) is made of metal. The metal has a superior abrasion (wear) resistance as compared with a resin such as polyimide, etc. Accordingly, also in a usage for a long period of time, the abrasion of the nozzles 31 is small, which in turn makes it possible to realize a stable discharge at the high frequency.

The actuator 22*x* is the stacked body which includes the piezoelectric layers 61 and 62 and the electrodes 51 and 52 and which is adhered to the upper surface of the sealing member 23 (the surface, in the sealing member 23, on the opposite side to the channel member 21). In this case, since the sealing member 23 is arranged between the actuator 22*x* and the channel member 21, even in a case that any crack occurs in the piezoelectric layers 61 and 62, the ink inside the channel member 21 does not enter into the crack in the piezoelectric layers 61 and 62, thereby making it possible to avoid any inconvenience which would be otherwise occurred due to the entry of the ink into the crack (such as a short circuit in the electrodes 51 and 52, etc.).

Modifications

Although the embodiment of the present disclosure has been explained above, the present disclosure is not limited to or restricted by the above-described embodiment, and various design changes can be made within the scope of the claims.

The driving signal X according to the present disclosure is not limited to or restricted by being such a configuration that the main pulse Pm and the cancel pulse Pc are rectangular as in the above-described embodiment (see FIG. 5). Further, the driving signal X according to the present disclosure is not limited to inclusion of the pre-pulse Pp as in the above-described embodiment (see FIG. 5). Further, the driving signal X according to the present disclosure is not limited to such a configuration that the driving potential (VDD) of the main pulse Pm and the driving potential (VDD) of the cancel pulse Pc are mutually same, as in the above-described embodiment (see FIG. 5). Moreover, in the above-described embodiment, although the electrode constructing the actuator has a two-layered structure including the individual electrodes and the common electrode, the electrode constructing the actuator may have a three-layered structure (for example, a structure including a driving electrode to which a high potential and a low potential is selectively applied, a high potential electrode which is maintained at the high potential and a low potential electrode which is maintained at the low potential).

Figure 9:
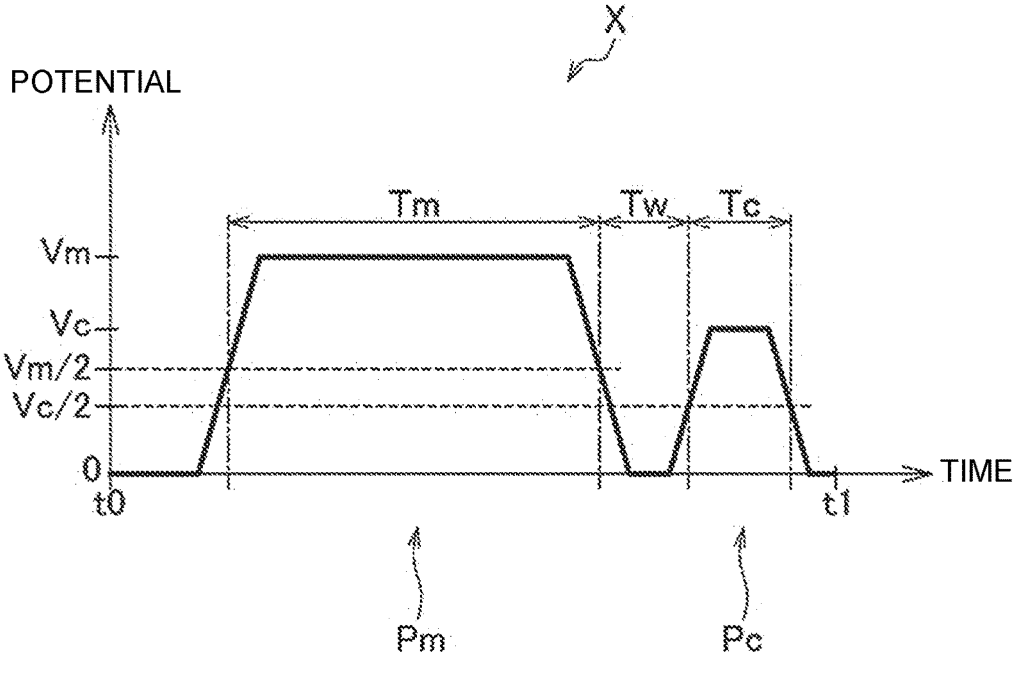
FIG. 9 is a graph indicating a driving signal according to a modification of the present disclosure.

For example, a driving signal X according to a modification of FIG. 9 is applicable to a driving electrode of the above-described three-layered structure; in the driving signal X, the potential is raised at a start point of the pulse and the potential is lowered at an end point of the pulse. Further, each of the main pulse Pm and the cancel purse Pc has a trapezoidal shape. The pre-pulse Pp is omitted. A driving potential (Vm) of the main pulse Pm and a driving potential (Vc) of the cancel pulse Pc are mutually different.

In a case that each of the main pulse Pm and the cancel pulse Pc has the trapezoidal shape as depicted in FIG. 9, Tw is derived, with a width of the main pulse Pm at half (Vm/2) the driving potential (Vm) being Tm and a width of the cancel pulse Pc at half (Vc/2) of the driving potential (Vc) being Tc.

In the above-described embodiment (see FIG. 5) and the above-described modification (see FIG. 9), although the width Tc of the cancel pulse Pc is smaller than the width Tm of the main pulse Pm, the present disclosure is not limited to this.

The head is not limited to being the head of the serial system, and may be a head of a line system.

The object of discharge is not limited to being the paper sheet, and may be, for example, cloth (fabric), a substrate or a plastic member, etc.

The liquid discharged from the nozzle is not limited to the ink, and may be an arbitrary liquid (for example, a treatment liquid which agglutinates or precipitates a component in the ink, etc.).

The present disclosure is not limited to being applicable to the printer, and is applicable also to facsimiles, copy machines, multifunction peripherals, etc. Further, the present disclosure is applicable also to a liquid droplet discharging apparatus used for any other application than the recording of an image. For example, the present disclosure is applicable to a liquid droplet discharging apparatus which forms an electroconductive pattern by discharging an electroconductive liquid on a substrate.

What is claimed is:

1. A liquid droplet discharging apparatus, comprising:

a channel member having a nozzle and a pressure chamber communicating with the nozzle;

an actuator configured to apply pressure to liquid inside the pressure chamber; and a controller configured to apply a driving signal to the actuator, wherein within one discharging cycle for forming one dot, the driving signal includes: a main pulse for causing a liquid droplet of the liquid to be discharged from the nozzle; and a cancel pulse which is applied to the actuator after the main pulse, the cancel pulse being a pulse for canceling a pressure wave, inside the pressure chamber, generated by application of the main pulse, the controller is configured to drive the actuator in a pull-strike system of increasing volume of the pressure chamber from a predetermined volume and then decreasing the volume to be not more than the predetermined volume to thereby cause the liquid droplet to be discharged from the nozzle, and in a case that a driving frequency of the driving signal is f (unit: kHz), a time from an end point of the main pulse up to a start point of the cancel pulse is Tw (unit: usec) and a width of the cancel pulse is Tc (unit: usec), the following expressions (1) and (2) hold:

$$50 \leq f \leq -11.3 \times (Tw + Tc) + 120; \quad (1)$$

and $$Tw + Tc \leq 5.2. \quad (2)$$

2. The liquid droplet discharging apparatus according to claim 1, wherein the following expression (3) holds:

$$Tc \leq -0.4Tw + 4.3. \quad (3)$$

3. The liquid droplet discharging apparatus according to claim 1, wherein each of the main pulse and the cancel pulse is rectangular.

4. The liquid droplet discharging apparatus according to claim 1, wherein a recording resolution which is a resolution of an image to be recorded by the liquid droplet is not less than 1200 dpi.

5. The liquid droplet discharging apparatus according to claim 4, wherein the channel member has a plurality of nozzles including the nozzle, the nozzles being aligned in a first direction at a density of not less than 50 dpi and constructing a plurality of nozzle rows arranged side by side in a second direction crossing the first direction, and positions in the first direction of the nozzles are shifted between the nozzle rows.

6. The liquid droplet discharging apparatus according to claim 1, wherein in a case that a width of the main pulse is Tm (unit: usec) and a round trip propagation time of the pressure wave in an individual channel including the pressure chamber and the nozzle is AL (Acoustic Length; unit: μsec), the following expression (4) holds:

$$AL \times 0.7 \leq Tm \leq AL \times 1.3. \quad (4)$$

7. The liquid droplet discharging apparatus according to claim 6, wherein the AL is not more than 6 μsec.

8. The liquid droplet discharging apparatus according to claim 1, wherein a member constructing the nozzle is made of metal.

9. The liquid droplet discharging apparatus according to claim 1, wherein the actuator is a piezoelectric element of a unimorph type.

10. The liquid droplet discharging apparatus according to claim 1, wherein the channel member has a surface in which the pressure chamber is opened, the liquid droplet discharging apparatus further comprises a sealing member arranged on the surface of the channel member and configured to seal the pressure chamber, and the actuator is a stacked body which is adhered to a surface, of the sealing member, on a side opposite to the channel member and which includes a piezoelectric layer and an electrode.

* * * * *